(12) United States Patent
Kehl

(10) Patent No.: US 7,980,395 B2
(45) Date of Patent: Jul. 19, 2011

(54) CROSS-FLOW FILTRATION SYSTEM

(75) Inventor: Dennis L. Kehl, Benton Harbor, MI (US)

(73) Assignee: Whirlpool Corporation, Benton Harbor, MI (US)

(*) Notice: Subject to any disclaimer, the term of this patent is extended or adjusted under 35 U.S.C. 154(b) by 273 days.

(21) Appl. No.: 12/361,721

(22) Filed: Jan. 29, 2009

(65) Prior Publication Data

US 2010/0187190 A1 Jul. 29, 2010

(51) Int. Cl.
*B01D 25/38* (2006.01)
*B08B 9/027* (2006.01)
*B01D 33/00* (2006.01)
*B02B 3/00* (2006.01)

(52) U.S. Cl. ............ 210/415; 210/357; 210/416.1; 210/196; 210/791; 134/110; 134/111

(58) Field of Classification Search ............ None
See application file for complete search history.

(56) References Cited

U.S. PATENT DOCUMENTS

| | | | | |
|---|---|---|---|---|
| 3,334,760 A * | 8/1967 | Bolinger et al. | ............ | 414/439 |
| 3,989,054 A * | 11/1976 | Mercer | ............ | 134/104.1 |
| 4,972,861 A * | 11/1990 | Milocco et al. | ............ | 134/104.1 |
| 5,779,812 A | 7/1998 | Thies et al. | | |
| 5,803,100 A | 9/1998 | Thies | | |
| RE37,831 E | 9/2002 | Thies | | |
| 2006/0118146 A1* | 6/2006 | Deog Jeong et al. | ........ | 134/56 D |
| 2007/0034240 A1 | 2/2007 | Berner et al. | | |
| 2008/0116135 A1* | 5/2008 | Rieger et al. | ............ | 210/650 |

FOREIGN PATENT DOCUMENTS

| | | |
|---|---|---|
| EP | 0518806 A1 | 12/1992 |
| GB | 2342146 A | 4/2000 |
| WO | 00/24499 A1 | 5/2000 |

* cited by examiner

*Primary Examiner* — Krishnan S Menon
(74) *Attorney, Agent, or Firm* — Robert A. Bacon; McGarry Bair PC

(57) ABSTRACT

An apparatus and method for filtering working fluid in an appliance with a cross-flow filter located within a recirculation circuit.

5 Claims, 10 Drawing Sheets

US 7,980,395 B2

CROSS-FLOW FILTRATION SYSTEM

BACKGROUND OF THE INVENTION

Filters can be used to reduce water consumption in a washing appliance for cleaning various articles, such as a dishwasher or washing machine, by extending the useful capacity of a working fluid by cleaning working fluid that has become entrained with various soils, debris, and other foreign particles that have been removed from the articles. The filter extracts soil from the working fluid, and the filtered working fluid can be recirculated and reused.

The majority of filters employed are conventional cake filters as shown in FIG. 1, which operate under the principle of size exclusion. However, cake filters can only filter a limited amount of working fluid before particles begin to accumulate on the surface of the filter, forming the cake. As the cake thickens, the pressure necessary for the working fluid to flow through the cake to the filter increases, which reduces and eventually destroys the cleaning ability of the cake filter.

An alternative to cake filtration is cross-flow filtration as shown in FIG. 2, which also employs the principle of size exclusion. Cross-flow filtration can comprise a three-port system where recirculating working fluid flows through the filter to clarify a portion of the working fluid. The working fluid flows in a direction tangential to the filter such that a portion of the working fluid flows across the filter and is then recirculated while another portion of the working fluid flows through the filter and exits as clarified working fluid. Some of the particles that lodge on the filter surface are carried off by the recirculating working fluid. However, shear forces produced by the working fluid flowing across the filter is not enough to remove all particles from the filter surface, and the particles build up and eventually clog the filter.

SUMMARY OF THE INVENTION

According to a first embodiment of the inventions, a method of filtering working fluid in an appliance having a wash chamber, a recirculation circuit for recirculating working fluid in the wash chamber, and a cross-flow filter located within the recirculation circuit for filtering particles from the working fluid comprises dislodging particles from the cross-flow filter by recirculating working fluid through the recirculation circuit such that the working fluid passes along the cross-flow filter at a rate sufficient to dislodge particles from the cross-flow filter.

According to a second embodiment of the invention, an appliance comprises a washing chamber for holding articles to be washed, a recirculation circuit for recirculating working fluid in the wash chamber, a cross-flow filter located within the recirculation circuit for filtering particles from the working fluid, and a pump for recirculating the working fluid at a rate sufficient to dislodge particles from the cross-flow filter.

According to a third embodiment of the invention, an appliance comprises a washing chamber for holding articles to be washed, a recirculation circuit for recirculating working fluid in the wash chamber, a cross-flow filter located within the recirculation circuit for filtering particles from the working fluid, and a rotating disc spaced from the cross-flow filter for enhancing a shear force associated with the working fluid passing along the cross-flow filter.

DESCRIPTION OF AN EMBODIMENT OF THE INVENTION

Figure 1:
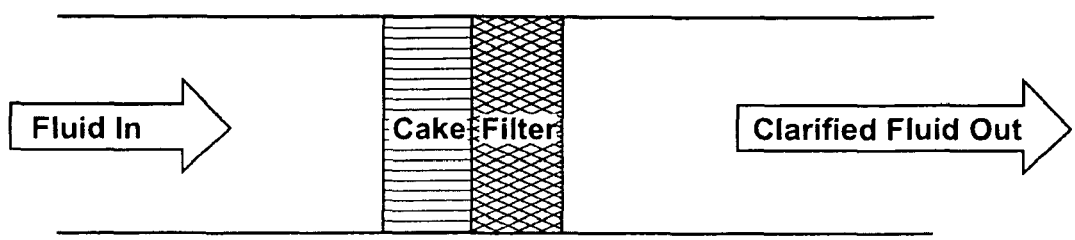
FIG. 1 is a schematic illustration of a conventional cake filter.
Figure 2:
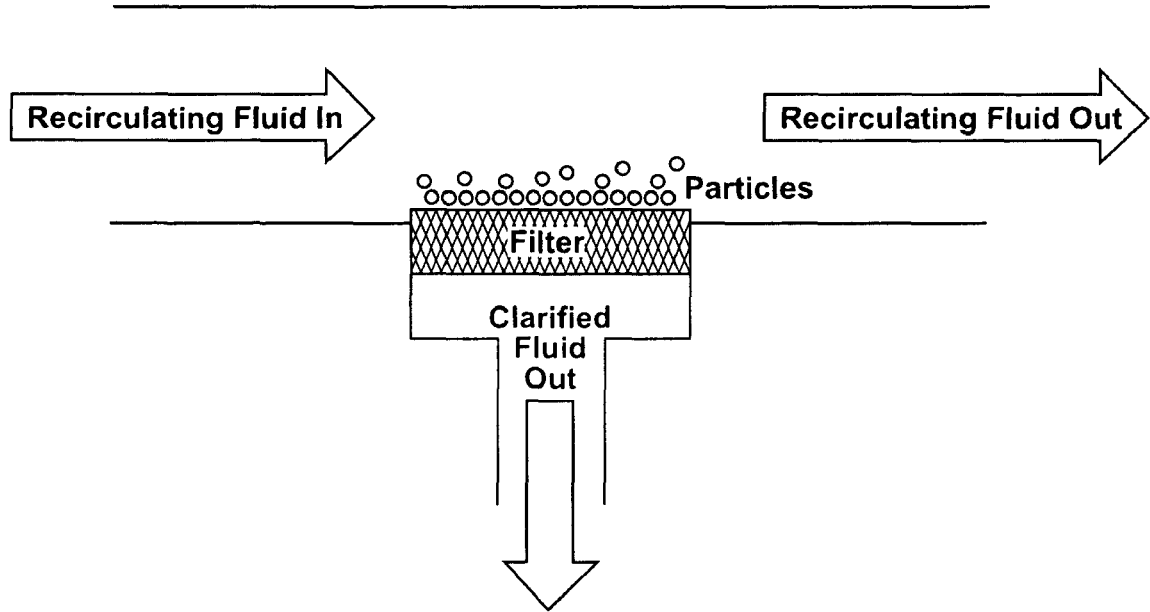
FIG. 2 is a schematic illustration of a conventional cross-flow filter.
Figure 3:
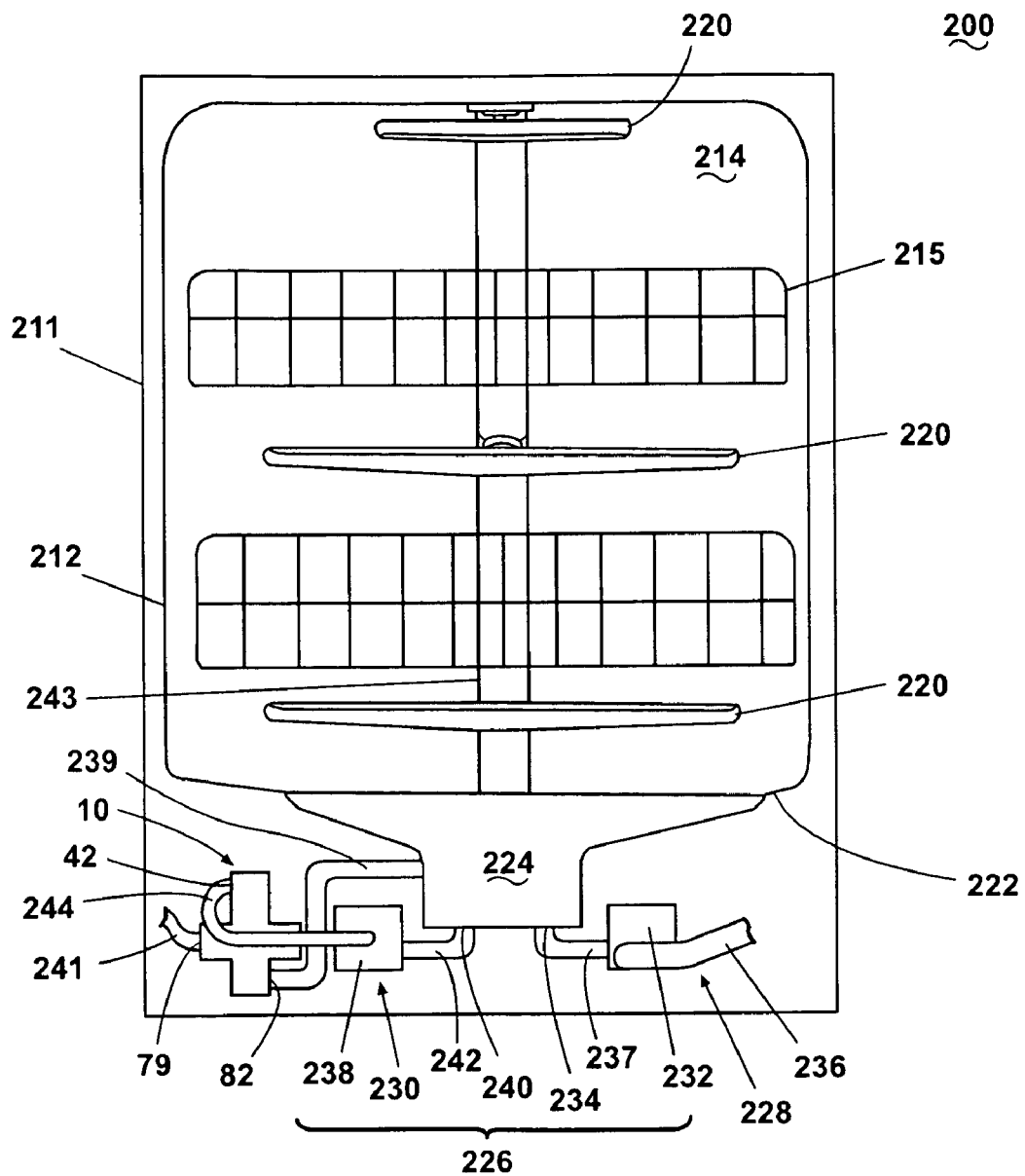
FIG. 3 is a schematic interior view of a dishwasher incorporating a filtration system according to an embodiment of the invention.

FIG. 3 illustrates a dishwasher 200 that can utilize the inventive filtration system 10 according to one embodiment of the invention. The dishwasher 200 shares many features of a conventional automated dishwasher, which will not be described in detail herein except as necessary for a complete understanding of the invention. The dishwasher 200 comprises cabinet 211 in which is provided a tub 212 defining a wash chamber 214 in which utensils are received for washing. The utensils can be held by a plurality of racks 215. A door (not shown) can be provided for selective access to the wash chamber 214. The wash chamber 214 can comprise one or more sprayers 220 from which working fluid can be sprayed for washing utensils placed within the wash chamber 214. The sprayers 220, while illustrated as rotating arms, can be fixed and may have a configuration other than an arm. A bottom 222 of the tub 212 can slope towards a sump 224.

The dishwasher 200 can further comprise a working fluid recirculation and drainage system 226 that can be used during an operating cycle of the dishwasher 200 for recirculating working fluid that collects in the sump 224, draining working fluid from the sump 224, and recirculating working fluid in the wash chamber 214, such as by pumping working fluid to the sprayers 220. Working fluid can comprise water optionally mixed with a wash aid to facilitate the cleaning process. Wash aids can include detergents, water softeners, fabric softeners, whitening agents, brightening agents, in-wash stain removers, color safe bleaches, peroxygen bleaches and the like. The working fluid can collect in the sump under the force of gravity.

The working fluid recirculation and drainage system 226 can comprise a drain circuit 228 and a recirculation circuit 230. The drain circuit 228 can be fluidly connected with the sump 224 to drain working fluid and particles that collect in the sump 224 through one or more drain inlets 234 located at the bottom of the sump 224. The drain circuit 228 can further comprise a drain pump 232 fluidly coupling the drain inlets 234 to a drain hose 236, which is fluidly coupled to a household drain (not shown). In this manner, the drain pump 232 can be actuated to draw working fluid and particles from the sump 224 and direct them to the household drain. The drain inlets 234 can be fluidly connected with the drain pump 232 by a manifold assembly, for example, or the fluid inlets 234 can each be directly connected with the drain pump 232 through a hose 237. In some configurations, the inlet to the drain pump 232 can also form the drain inlets 234.

The recirculation circuit 230 can also comprise the filtration system 10. The filtration system 10 can be configured for use with the working fluid recirculation and recirculation circuit 230 to remove particles entrained in the working fluid that have been removed from the utensils or other articles being cleaned in the wash chamber 213. The filtration system 10 can be installed outside of the wash chamber 214 and coupled to the working fluid recirculation and drainage system 226 in any suitable manner enabling working fluid from the sump 224 to be pumped through the filtration system 10 such that at least a portion of working fluid from the sump 224 flows through or is pumped through the filter system 10. Any number of configurations can be utilized to connect the filtration system 10 to the working fluid recirculation and drainage system 226, including the use of additional hoses.

In the embodiment illustrated in FIG. 3, the recirculation circuit 230 further comprises a recirculation pump 238, a first supply hose 239, one or more recirculation inlets 240, second supply hose 241, a third supply hose 242, and a fourth supply hose 244. The third supply hose 242 can fluidly couple the recirculation pump 238 with the sump 224 through one or more recirculation inlets 240 located at the bottom of the sump 224 to recirculate liquid from the sump 224 to the filtration system 10. Alternatively, the recirculation inlets 240 can be coupled to the recirculation pump 238 by a manifold assembly (not shown). The fourth supply hose 244 can fluidly couple the recirculation pump 238 to a working fluid inlet 42 of the filtration system 10.

The first supply hose 239 and second supply hose 241 can be fluidly coupled to a working fluid outlet 81 and to a clarified working fluid outlet 79, respectively, of the filtration system 10. The first supply hose 239 can also be fluidly coupled to the sump 224 for recirculating working fluid from the filtration system 10 back to the sump 224. The second supply hose 241 can be fluidly coupled with one of more of the sprayers 220. For example, the second supply hose 241 can fluidly couple the filtration system 10 with the sprayer 220 located at the bottom of the wash chamber 214 and/or to a supply conduit 243 that extends upwards along a sidewall of the wash chamber 214 to fluidly connect with one or more additional sprayers 220 located within the wash chamber 214. Alternatively, the second supply hose 241 can be fluidly coupled to a reservoir (not shown) for storing clarified working fluid for subsequent use.

While the filtration system 10 is illustrated in the environment of the dishwasher 200, the filter system 10 has utility in other environments, including other appliances, especially in automatic clothes washing machines. Appliances are configured to perform an operation on a physical article, such as clothing or food, during an operating cycle using at least one working fluid. An operating cycle is a set of commands that the appliance executes to operate the appliance. For example, a dishwasher can have several operating cycles in the form of wash cycles that depend on the type of utensils being washed or on a size of a load of utensils. Typically, the appliance when purchased by the user has a predefined set of operating cycles, although the user can optionally be enabled to edit the predefined operating cycles or enter new operating cycles into the appliance. The appliance can optionally also use at least one additional resource such as temperature-controlled air (hot or cold), steam, gas, electricity, a second working fluid, and the like. Exemplary appliances for use with the inventive filtration system 10 include, but are not limited to, clothes washing machines, clothes dryers, ovens, dishwashers, refrigerators, freezers, microwave ovens, water filters, and countertop appliances, such as coffee makers, and the like. In order to utilize the filtration system 10, the appliance comprises at least one element that uses a working fluid that benefits from filtration. For example, the appliance can comprise a steam generator that receives water filtered by the inventive filtration system 10.

Figure 4:
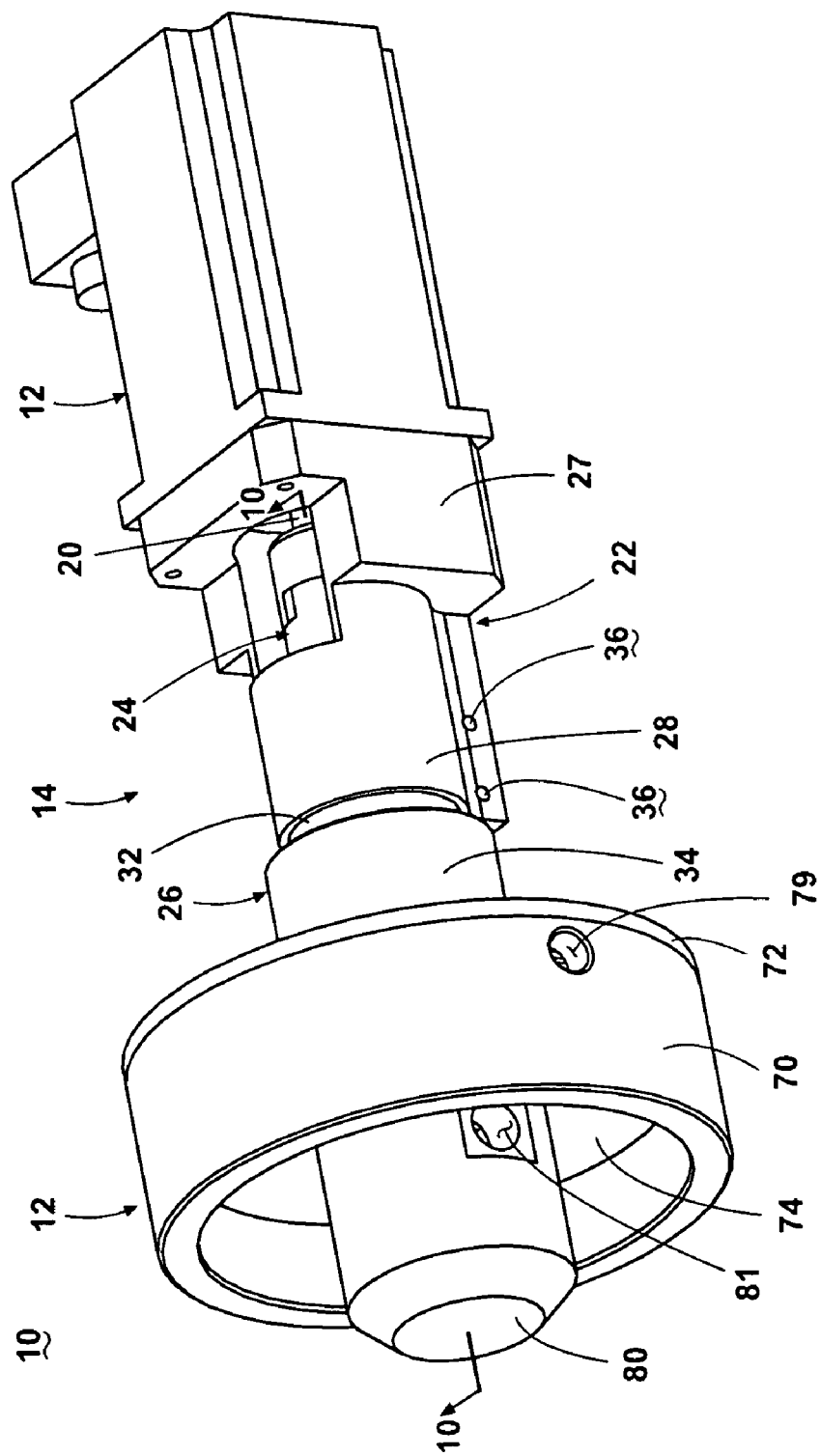
FIG. 4 is a perspective view of a cross-flow filtration system according an embodiment of the invention.

The details of the cross flow filter system 10 are illustrated beginning with FIG. 4, where the filtration system 10 comprises a motor 12, a coupling assembly 14, and a filter assembly 16. The motor 12 is a conventional electric motor having components common to a motor, such as a shaft 20, a rotor (not shown), and a stator (not shown). The motor 12 is electrically coupled to a source of power in the appliance 200 in a conventional manner, such as by connecting electric leads from the appliance to terminals (not shown) on the motor 12. For purposes of describing the invention, the filtration system 10 will be oriented such that the motor 12 is positioned at an upper end of the filtration system 10 and the filter assembly 16 is positioned at a lower end of the filtration assembly 16. It is also possible to utilize the inventive filtration system 10 in other orientations.

Figure 5:
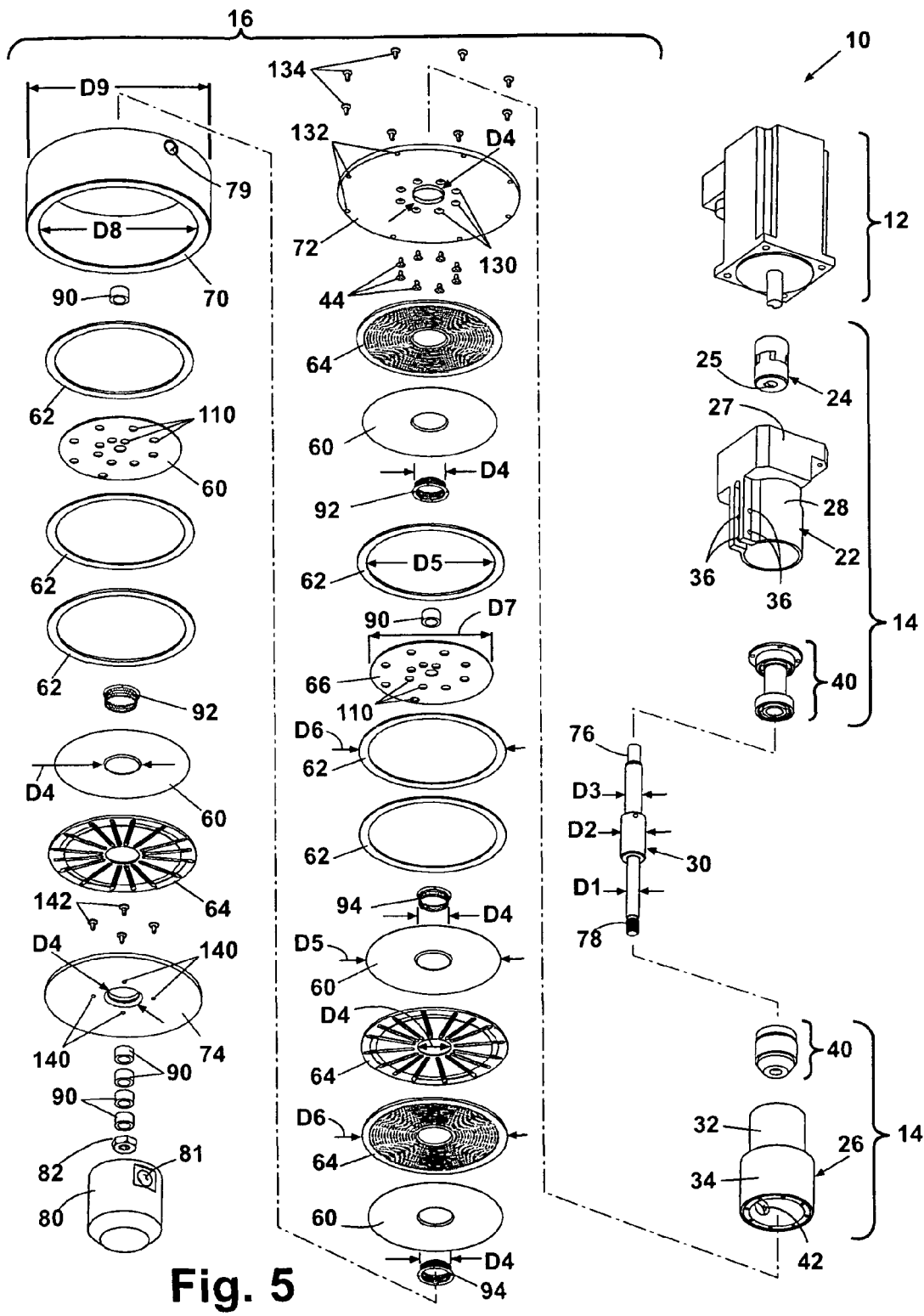
FIG. 5 is an exploded view of the cross-flow filtration system of FIG. 4.

Referring to FIG. 5, the coupling assembly 14 is configured to couple the motor 12 to the filter assembly 16 in a manner preventing the migration of fluid 16 to the motor 12. The coupling assembly 14 comprises a substantially hollow motor adaptor 22 and a shaft coupler 24. The motor adapter 22 is sized to receive the shaft coupler 24, portions of shafts 20 and 30, which are part of the motor 12 and filter assembly 16, respectively, and a portion of a bearing support 26. The motor adapter 22 comprises a motor mounting portion 27 and a generally cylindrical coupling portion 28. The motor mounting portion 27 is configured to mount to a lower portion of the motor 22 in any suitable manner, such as by using screws or other mechanical fasteners, or by gluing. The coupling portion 28 of the motor adaptor 22 is configured to receive a portion of the bearing support 26. The coupling portion 28 can be configured as a clamp and can be clamped about an upper cylinder 32 of the bearing support 26 in a well-known manner by inserting screws (not shown) through clamp apertures 36 and tightening nuts (not shown) about the screws. Alternatively, the coupling portion 28 can be configured for an interference fit with the upper cylinder 32. The shaft coupler 24 can be formed of any suitably durable and water-impermeable material, such as molded plastic.

The shaft coupler 24 is configured to couple the shaft 20 of the motor 12 to the shaft 30 of the filter assembly 16 in a manner that transmits rotations of the shaft 20 to the shaft 30. The shaft coupler 24 has a generally cylindrical shape with an aperture 25 sized to receive a portion of each of the shafts 20, 30. In the event that the portions of the shafts 20, 30 received by the shaft coupler 24 do not have the same diameter, the shaft coupler 24 can comprise two interlocking pieces, each having a corresponding aperture 25 of different diameters configured to accommodate the portions of the shafts 20, 30. When the shaft coupler 24 is positioned adjacent the motor 12 in the motor mounting portion 27, the shaft 20 can extend partially into the aperture 25. The shaft coupler 24 is sized to extend from the motor mounting portion 27 and partially into the coupling portion 28 where a tip 76 of the shaft 30 can extend partially into the aperture 25 such that the shaft 20 and shaft 30 can be axially aligned within the shaft coupler 24.

The shaft coupler 24 can be formed of any suitably durable and water-impermeable material, such as molded plastic.

The bearing support 26 comprises two integrally formed and axially aligned hollow cylinders 32, 34 and is open at both upper and lower ends. Upper cylinder 32 has a smaller radius relative to lower cylinder 34. The bearing support 26 houses a plurality of sealing elements 40, including conventional bearings and spacers. The sealing elements 40 are configured to rotatably receive the shaft 30 of the filter assembly 16 in the bearing support 26 while preventing moisture from migrating up the shaft 30 to the motor 12. The bearing support 26 further includes an inlet 42 in the form of an aperture extending through a side of the lower cylinder 34 for enabling working fluid to flow into the filter assembly 16. The inlet 42 can have any particular shape, such as a circle. Working fluid can be directed to the inlet 42 via the fourth supply hose 244, which is connected to the recirculation pump 238 of the working fluid recirculation and drainage system 226. The bottom of the bearing support 26 can be coupled to the filter assembly 16 by screws 44. The bearing support 26 can be formed of any suitably durable and water-impermeable material, such as molded plastic.

With continued reference to FIG. 5 the filter assembly 16 comprises the shaft 30, a plurality of filter papers 60, filter spacers 62, filter supports 64, and shear discs 66 configured to be held within a cavity formed by outer shell 70 and inlet and outlet covers 72 and 74, respectively. The filter assembly further comprises an end cap 80, a nut 82, a plurality of spacers 90, and filter locks 92, 94.

The shaft 30 has a generally cylindrical shape and can vary in radius along its length so as to accommodate various sealing elements 40 configured to prevent the migration of working fluid to the motor 12. Specifically, shaft 30 can comprise a lower portion of diameter D1, a middle portion of diameter D2, and an upper portion of diameter D3. Diameter D3 can be larger than D1 but smaller than D3. The tip 76 of the shaft 30 is configured to be received by the shaft coupler 24. The tip 76 can have a diameter approximately equal to D1. The shaft 30 also comprises a threaded portion 78 at a lower end thereof having a diameter approximately equal to D1. The shaft 30 can be formed of any relatively durable and water-impermeable material, such as molded plastic. The nut 82 is a conventional nut and is configured to threadably engage the threaded portion 78 of the shaft 30.

The filter papers 60 comprise thin, semi-permeable disc-shaped pieces of paper for filtering the working fluid. The filter papers 60 have an inner diameter D4 greater than D1. The filter papers 60 have an outer diameter D5. The filter papers 60 can have any of various pore sizes, which can be chosen according to the specific working fluid being filtered in order to best remove foreign particles from the working fluid. The filter papers 60 can vary in pore size within the filter assembly 16 such that at least one filter paper 60 has a smaller pore size than the other filter papers 60 in the filter assembly 16, or the filter papers 60 can all have the same pore size. Other types of filters can be used in place of the filter papers 60, such as cloth or plastic filters.

The filter spacers 62 comprise relatively thin circular rings formed of any relatively durable and water-impermeable material, such as molded plastic. The filter spacers 62 have an inner diameter D5 equivalent to the outer diameter D5 of the filter papers 60 and an outer diameter D6 greater than D5.

Figure 6:
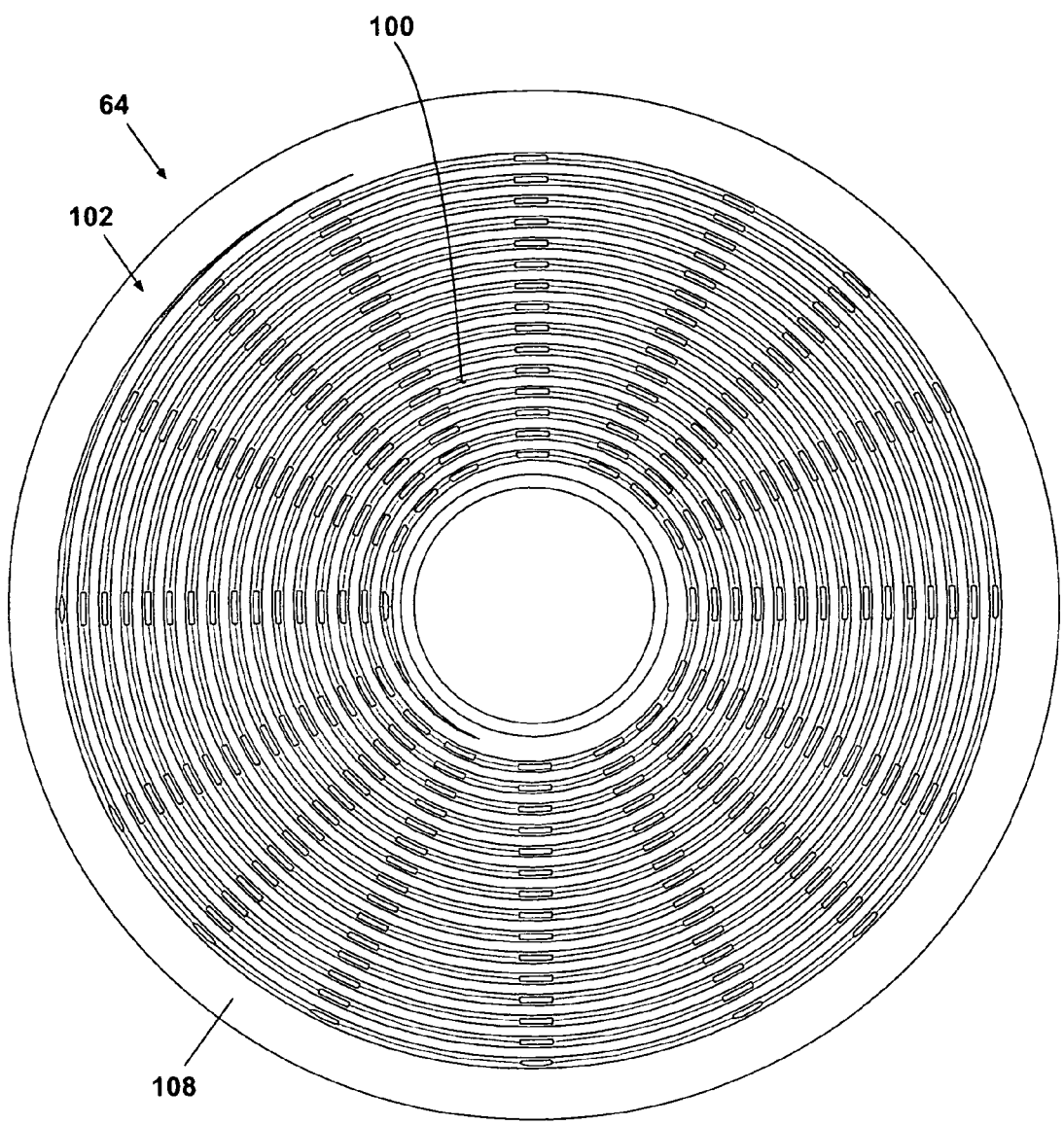
FIG. 6 is a plan view of a first side of a filter support of the filtration system of FIG. 3.

As shown in FIG. 6, the filter supports 64 comprise circular discs formed of any substantially rigid and water-impermeable material, such as molded plastic. The filter supports 64 can have a thickness substantially similar to that of the filter spacers 62. Alternatively, the filter supports 64 can be thinner or thicker than the filter spacers 62. The filter supports 64 have an inner diameter D4 and an outer diameter D6. The filter supports 64 each comprise a spiral channel 100 on a filter paper receiving side or first side 102 and a plurality of radial channels 104 on a second side 106 best shown in FIG. 7. The spiral channel 100 spirals tightly and radially outward on the first side 102 from the inner diameter D4 to a diameter D5 equivalent to the outer diameter of the filter papers 60 so that the filter papers 60 can be supported upon the spiral channel 100. Alternatively, the spiral channel 100 can be replaced by a plurality of circular channels increasing gradually in diameter as they extend radially outward along the filter support 64 from the inner diameter D4 to a diameter D5, which would produce a similar appearance and function. The spiral channel 100 extends only partially through the side 102 of the filter support 64 in an axial direction. The spiral channel 100 can have a triangular cross-section. Alternatively, the cross-section of the spiral channel 100 can be semi-circular, rectangular, or any other shape. From diameter D5 to diameter D6, the side 102 can comprise a flattened outer portion 108.

Figure 7:
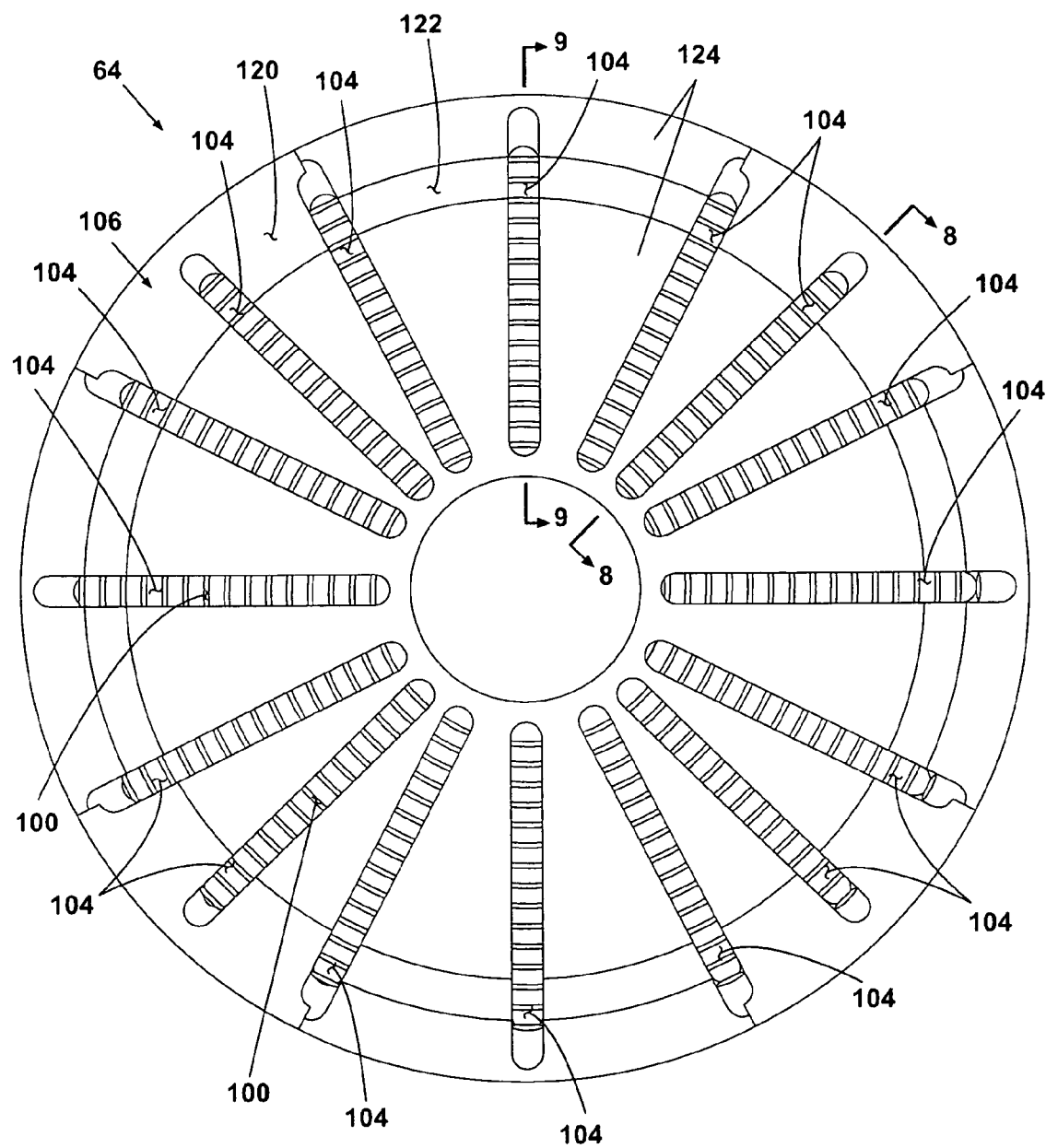
FIG. 7 is a plan view of a second side of a filter support of FIG. 6.

As shown in FIG. 7, the radial channels 104 begin slightly inward of the inner diameter D4 and extend almost to the outer diameter D6 on the second side 106. The radial channels 104 can comprise elongated channels having straight sides and rounded ends. Alternatively, the radial channels 104 can have any elongated shape suitable for the purposes described herein. The radial channels 104 can all have the same shape or may have a combination of different shapes. The radial channels 104 can be spaced circumferentially as shown with some of the radial channels 104 being spaced more closely together. Alternatively, the radial channels 104 can be spaced evenly circumferentially on the second side 104. The radial channels 104 extend only partially axially through the second side 106 of the filter support 64 such that the spiral channel 100 intermittently communicates with the radial channels 104.

Figure 8:
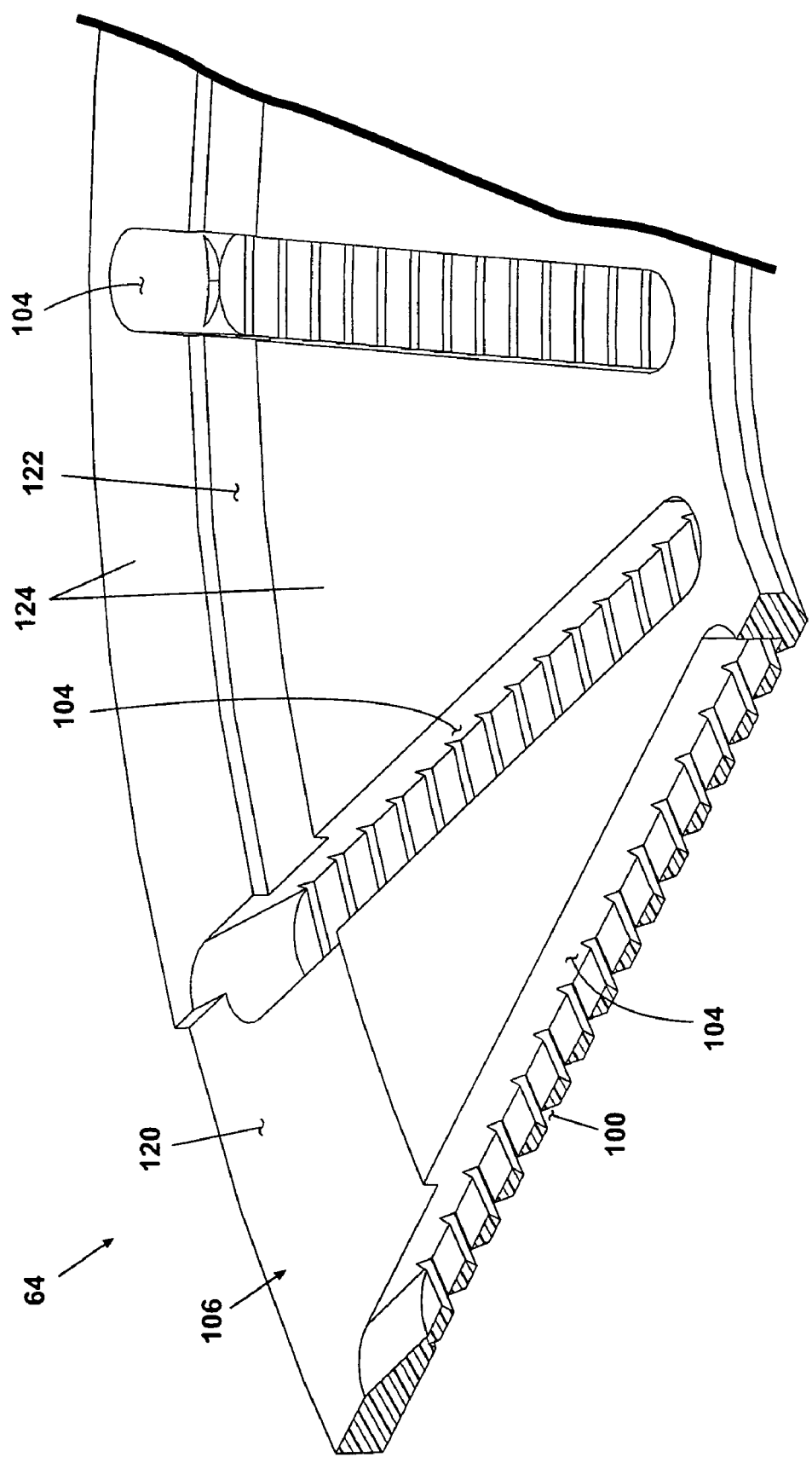
FIG. 8 is a perspective sectional view of the second side of the filter support taken along the line 8-8 of FIG. 7.
Figure 9:
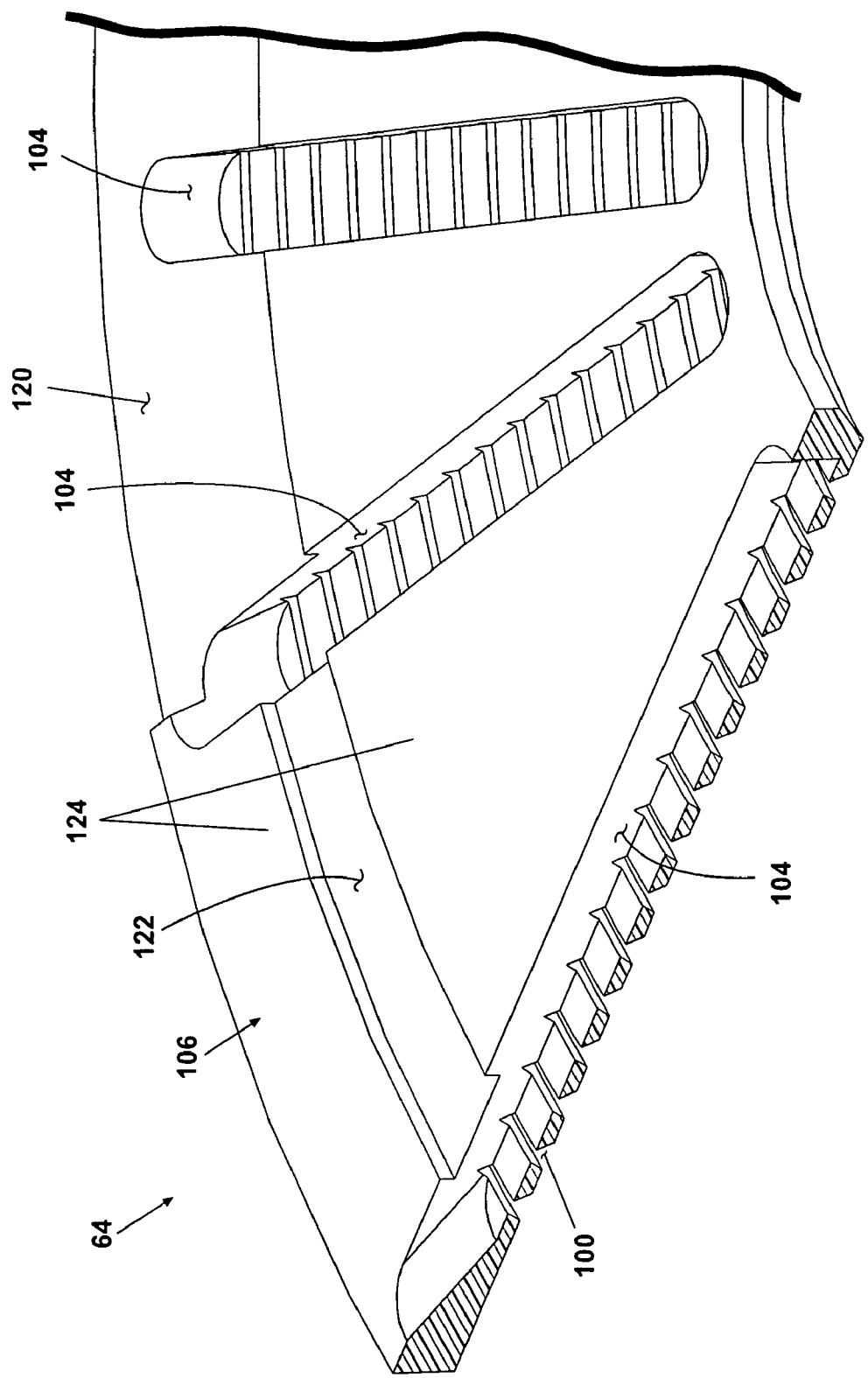
FIG. 9 is a perspective sectional view of the second side of the filter support taken along the line 9-9 of FIG. 7.

Referring now to FIG. 8, the second side 106 further comprises recessed edge portions 120 and recessed interior portions 122. The recessed edge portions 120 and recessed interior portions 122 comprise portions on the second side 120 of the filter support 64 that are recessed slightly compared to a top surface 124 of the filter support 64. The recessed edge portions 120 and recessed interior portions 122 can have the same depth as is also shown in FIG. 9. The recessed edge portions 120 and recessed interior portions 122 are relatively shallow compared to the spiral channel 100 and to the radial channels 104 such that when the filter assembly 16 is assembled, water can flow out of the radial channels 104 and into a space within the recessed edge portions 120 and recessed interior portions 122.

Referring again to FIG. 5, the shear discs 66 comprise circular discs formed of any substantially rigid and water-impermeable material, such as molded plastic. The shear discs 66 are illustrated as having a thickness approximately equal to that of one of the filter spacers 62. Alternatively, the shear discs 66 can have any thickness less than three times the thickness of one of the filter spacers 62. The shear discs 66 are configured having an inner diameter D1 so as to fit snugly about the lower portion of the shaft 30 for rotation therewith. The outer diameter D7 of the shear discs 66 is less slightly less than the diameter D5 such when one of the shear discs 66 and one of the filter spacers 62 are concentrically aligned, a space exists radially between an outer circumference of the shear disc 66 and an inner circumference of the filter spacer 22. Each of the shear discs 66 further comprises a plurality of apertures 110 extending completely therethrough. The apertures 110 can be spaced randomly on each shear disc 66 or can be spaced according to a particular pattern. The apertures 110 can all have the same size or can have different sizes. The apertures 110 can also all have the same shape or can have different shapes, for example but not limited to circles, squares, rectangles, triangles, or stars. In this particular embodiment, the apertures 110 are randomly spaced, vary in size, and have a circular shape.

With continued reference to FIG. 5, the outer shell 70 comprises a hollow cylinder formed of any suitably durable and water-impermeable material, such as molded plastic. The outer shell 70 is sized to concentrically receive the filter papers 60, filter spacers 62, filter supports 64, shear discs 66, and outlet cover 72. The outer shell 70 has an inner diameter D8 larger than the diameter D6. The outer shell 70 further includes an outlet 79 comprising a aperture extending through a side thereof for enabling clarified working fluid to flow out of the filter assembly 16. The outlet 79 can have any particular shape, such as a circle. Clarified working fluid can be directed from the outlet 79 to the second supply hose 241 of the working fluid recirculation and drainage system 226, which can be fluidly coupled to one of the sprayers 220, or to the reservoir.

The inlet cover 72 comprises a substantially flat and relatively thin disc having an outer diameter D9 an inner diameter D4. The inner diameter D4 of the inlet cover 72 can comprise a threaded portion for threadably engaging one of the filter locks 92. The inlet cover 72 can include a first plurality of apertures 130 configured to receive the screws 44. The inlet cover 72 can further comprise a second plurality of apertures 132 for receiving a plurality of screws 134. The outer shell 70 can further comprise apertures (not shown) configured to align with the apertures 132 to receive a portion of the screws 134. The inlet cover 72 can be formed of any substantially rigid and water-impermeable material, such as molded plastic.

The outlet cover 74 comprises a substantially flat and relatively thin disc having an outer diameter D8 and an inner diameter D4. The inner diameter D4 of the outlet cover 74 can comprise a threaded portion for threadably engaging one of the filter locks 92. The outlet cover 74 can include a plurality of apertures 140 configured to receive screws 142. The outlet cover 74 can be formed of any substantially rigid and water-impermeable material, such as molded plastic.

The end cap 80 comprises a cup-like member open at an upper end and including a working fluid outlet 81. The end cap 80 can have an inner diameter greater than D4 and less than an outer diameter of the end cap 80, which is greater than the inner diameter and less than D8. The end cap 80 can comprise can apertures (not shown) configured to align with the apertures 140 to receive a portion of the screws 142.

A plurality of conventional spacers 90 can be formed of any substantially durable and water-impermeable material, such as molded plastic or rubber. The spacers 90 are cylindrical in shape and have an inner diameter D1 so as to fit snugly about the lower portion of the shaft 30 for rotation therewith. The spacers 90 have an outer diameter slightly less than the diameter D4 such when the filter assembly 16 is assembled, a space exists radially between an outer circumference of the spacer 90 and the inner circumferences of the filter papers 60, filter spacers 62, and filter supports 64.

Filter locks 92, 94 can be formed of any substantially durable and water-impermeable material, such as molded plastic. Each filter lock 92, 94 comprises a small, flanged hollow cylinder having a diameter D4 configured for insertion into the inner diameter D4 of one of the filter supports 64 such that the flange pins one of the filter papers 60 axially therebetween. The filter locks 92 can comprise threading on an interior thereof for threadably engaging the portions of the inlet cover 72 and outlet cover 74 defining inner diameters D4. The filter locks 94 can be configured for an interference fit with the portion of the filter supports 64 defining the inner diameter D4.

Figure 10:
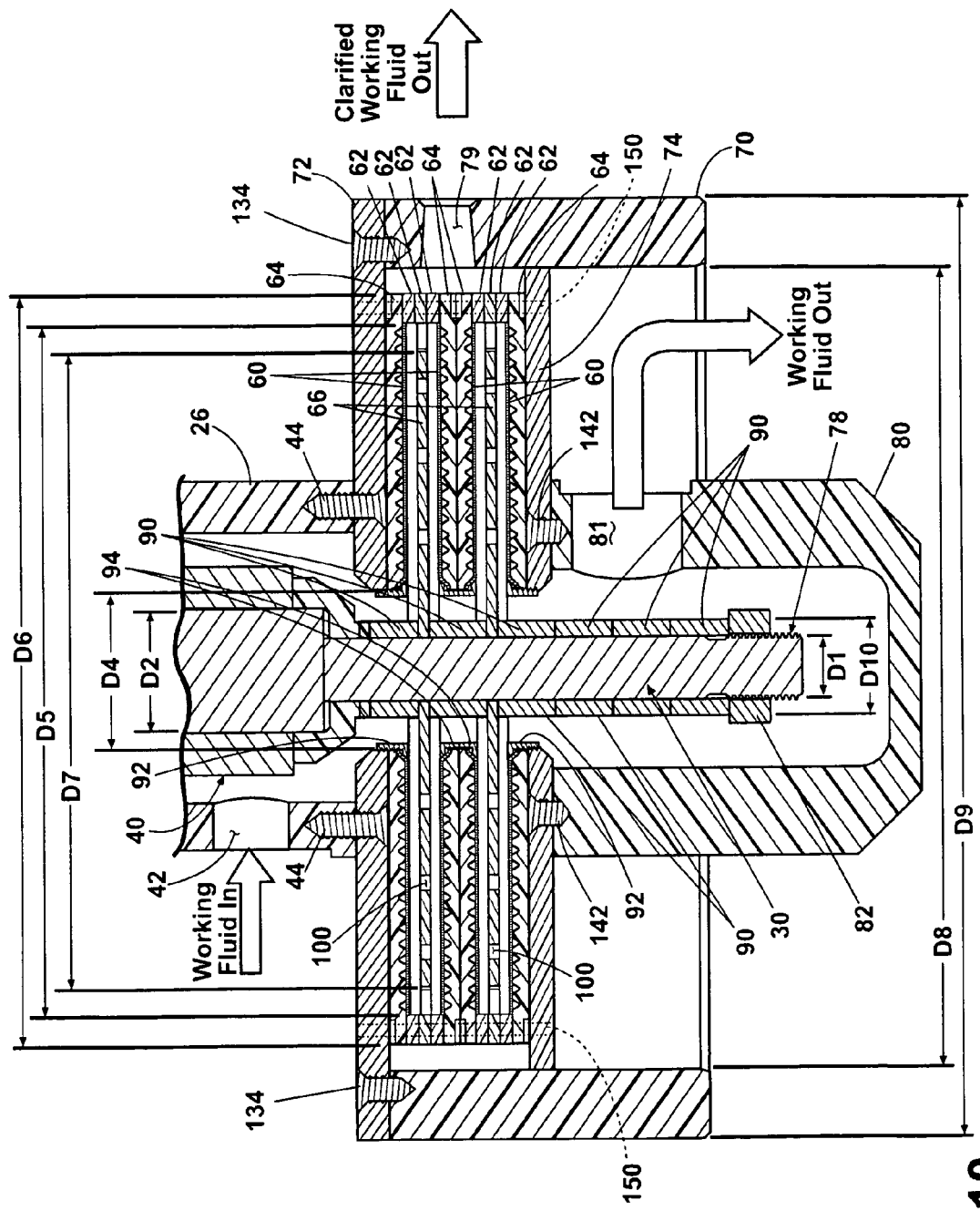
FIG. 10 is a sectional view of the filtration system taken along the line 10-10 of FIG. 4.

To assemble the filtration system 10, as is best shown in FIG. 10, the shaft coupler 24 can be inserted into the motor adapter 22. The shaft 30 of the motor 12 can be inserted into the shaft coupler 24, and the motor mounting portion 27 of the motor adapter 22 can be fastened to the motor 12. The sealing element 40 can be placed about the shaft 30, and the shaft 30 can also be inserted into the shaft coupler 24. The bearing support 26 can then be placed about the shaft 30, and the upper cylinder 32 can be clamped or otherwise held in place by the cylindrical coupling portion 28 of the motor adapter 22. Additional sealing elements 40 can be placed about the shaft 30, and the inlet cover 72 can be fastened to the bearing support 26 by inserting the screws 44 into the apertures 130 and then screwing them into the bottom of the lower cylinder 34. The outer shell 70 can be fastened to the inlet cover 72 by inserting the screws 134 into the apertures 132 and then screwing them into the top of the outer shell 70.

The shaft 30 extends from the shaft coupler 24, through the bearing support 26 and inlet cover 72, and into the outer shell 70. The filter papers 60, filter spacers 62, filter supports 64, and shear discs 66 are held within the cavity created by the outer shell 70 in the following manner. A first filter support 64 can be placed about the shaft 30 with its first side 102 facing downward and its second side 106 pressed against the inlet cover 72. A filter paper 60 can be placed on the first side 102 of the first filter support 64, and the filter lock 92 can threadably engage the threaded portion of the inlet cover 72 to pin the filter paper 60 against the first filter support 64 and to pin the first filter support 64 against the inlet cover 72. A first spacer 90 can be placed in the outer shell 70 about the shaft 30, and three filter spacers 62 can be placed against the first filter support 64. A first shear disc 66 can then be placed about the shaft 30 against the first spacer 90, and second spacer 90 can be placed against the opposite side of the first shear disc 66.

A second filter paper 60 can be placed on the first side 102 of a second filter support 64, and a first filter lock 94 can be pressed into the second filter support 64 against the filter paper 60 in a manner pinning the second filter paper 60 between the flange of the first filter lock 94 and the second filter support 64. The assembled second filter paper 60, second filter support 64, and first filter lock 94 can then be inserted into the outer shell 70 about the shaft 30 with the first side 102 facing upward and pressed against the third filter spacer 62.

A third filter paper 60 can be placed on the first side 102 of a third filter support 64, and a second filter lock 94 can be pressed into the third filter support 64 against the third filter paper 60 in a manner pinning the third filter paper 60 between the flange of the second filter lock 94 and the third filter support 64. The assembled third filter paper 60, third filter support 64, and second filter lock 94 can then be inserted into the outer shell 70 about the shaft 30 with the first side 102 facing downward and the second side 106 pressed against the second side 106 of the second filter support 64.

A second shear disc 66 can then be placed in the outer shell 70 about the shaft 30 against the second spacer 90, and a third spacer 90 can be placed against the opposite or downward-facing side of the second shear disc 66. Three additional filter spacers 62 can be placed about the shaft 30 against the third filter support 64. Three additional spacers 90 are also placed about the shaft 30, and the nut 82 can then be threaded onto the threaded portion 78 of the shaft 30 to secure the spacers 90 in position on the shaft 30.

The end cap 80 can be fastened to the lower side of the outlet cover 74 by inserting the screws 142 at the upper side of the outlet cover 74 downwardly through the apertures 140 in the outlet cover 74 and into the end cap 80. A fourth filter paper 60 can then be placed on the first side 102 of a fourth filter support 64, and a second filter lock 92 can threadably engage the threaded portion of the outlet cover 74 to pin the fourth filter paper 60 against the fourth filter support 64 and to pin the fourth filter support 64 against the upper side of the outlet cover 74. The assembled fourth filter paper 60, fourth filter support 64, second filter lock 92, outlet cover 74, and end cap 80 can then be inserted into the outer shell 70 about the shaft 30 with the first side 102 of the fourth filter support 64 facing upward and pressed against the sixth filter spacer 62. The outlet cover 74 can be held in place in the outer shell 70 by an interference fit. Alternatively, as shown in phantom in FIG. 9, the filter spacers 62, filter supports 64, inlet cover 72, and outlet cover 74 can include apertures 150 that are aligned when the filter assembly 16 is assembled such that a pin or screw can be inserted therethrough to secure the elements of the filter assembly 16 in place. When the filtration assembly 10 is assembled, the shear discs 66 are spaced slightly from the filter papers 60 by the spacers 90.

When the filtration system 10 is used during an operating cycle, electricity is supplied to the motor 12 to rotate the shaft 20. The rotations of the shaft 20 are transmitted to the shaft 30 to rotate the shear discs 66. The rotation of the shear discs 66 and the spacing of the shear discs 66 from the filter papers 60 results in the production of a shear force that dislodges particles from the surfaces of the filter papers 60. As the shear discs 66 are rotated, recirculating working fluid flows into the filtration system 10 via inlet 42. The working fluid can be pumped into the inlet 42 by the recirculation pump 238 via the fourth supply hose 244 in order to achieve a working fluid flow speed through the filtration system 10 great enough to push the working fluid entirely through the filtration system 10. This can vary according to the orientation of the filtration system 10, as gravity affects the flow of the working fluid through the filtration system 10. For example, in the exemplary orientation described herein, gravity would increase the flow speed of the working fluid through the filtration system 10. In this orientation, the flow speed of the working fluid into the inlet 42 must be no less than approximately 0.1 liters per minute in order to ensure that the working fluid will flow completely through the filtration system 10.

Additionally, the speed of the working fluid through the filtration system 10 must be great enough to, in combination with the shear force produced by the shear discs 66, dislodge particles from the filter papers 60. The rotational speed of the shear discs 66 can be increased in order to enable proper functioning of the filtration system 10 at lower working fluid flow speeds, which reduces the output required from the pump 238. In this manner, the rotational speed of the shear discs 66 can be selected based on the output of the pump 238. In order to produce a shear force great enough to prevent particles up to a given size from lodging on the filter papers 60 when the working fluid is flowing through the filtration system 10 at a given speed, the shafts 20/30 must be rotated to rotate the shear discs 66 at least at a given minimum speed. For example, the shear discs 66/shafts 20, 30 must be rotated at a speed of no less than 200 rotations per minute in order to dislodge particles up to a size of approximately 5 micrometers when the working fluid is flowing through the filtration system 10 at a rate of approximately 1 liter per minute.

Figure 11:
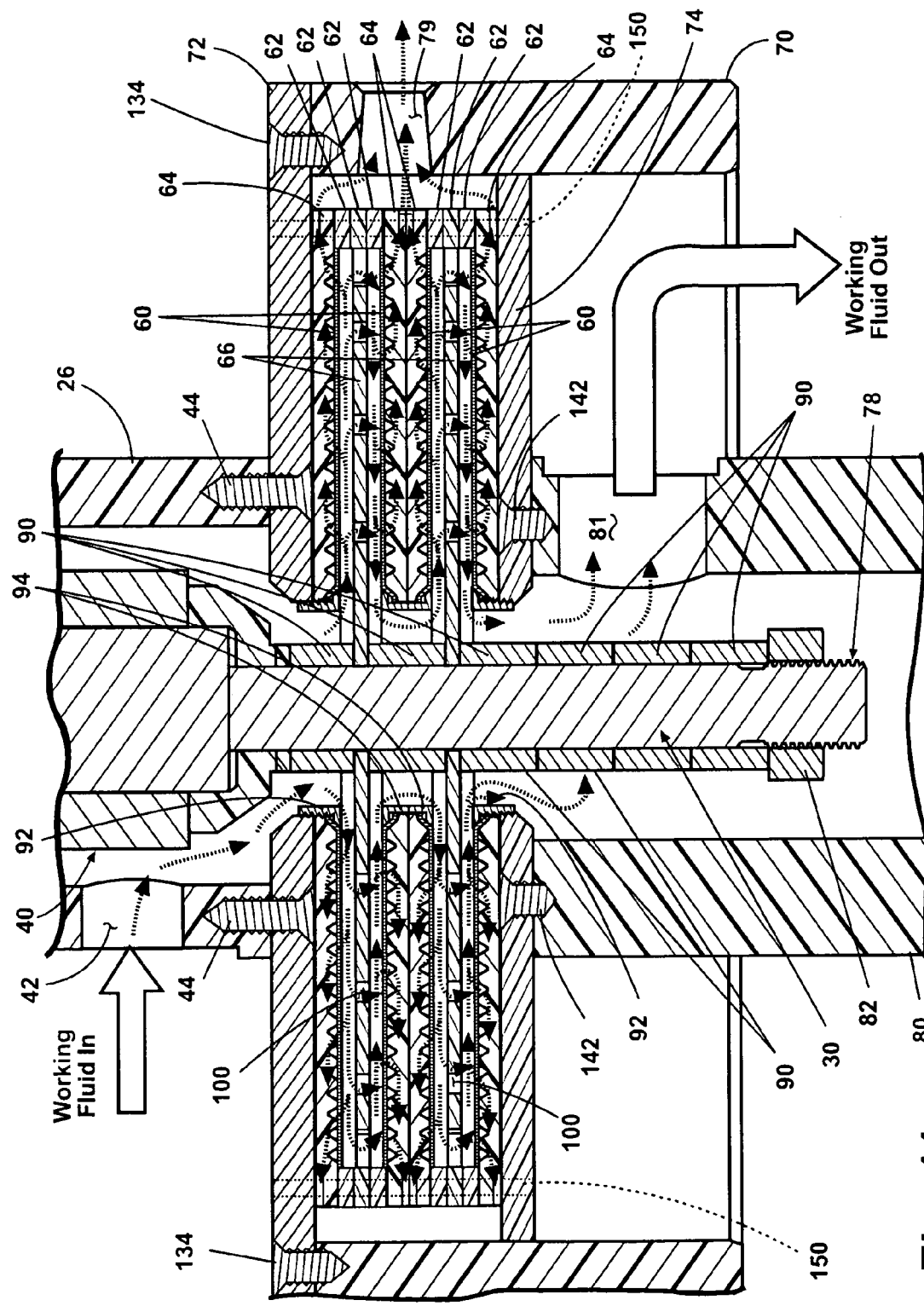
FIG. 11 is an enlarged view of the section view of the filtration system of FIG. 10.

Referring now at FIG. 11, upon entering the filtration assembly 10, the working fluid flows downward through the bearing support 26 and into the outer shell 70. As the working fluid flows through the filter assembly 16, a first portion of the working fluid can flow through the apertures 110 in the shear discs 66 and around the shear discs 66 without passing through any of the filter papers 60. A small portion of particles can still be removed from this first portion of working fluid due to the shear forces produced by the shear discs 66 and the flow of the working fluid as it passes along the surfaces of the filter papers 60. The first portion of the working fluid then flows into the end cap 80 and exits the filtration system 10 at the working fluid outlet 81 for recirculation to the sump 224 via the first supply hose 239 of the working fluid recirculation and drainage system 226.

A second portion of the working fluid flows through the filter papers 60. Some of this second portion of working fluid can flow some distance into the filtration system 10 before passing through one of the filter papers 60. For example, working fluid can flow around the first shear disc 66 and through the apertures 110 of the first shear disc 66 and then partially around the second shear disc 66 to then pass through the third filter paper 60. As the working fluid passes through one of the filter papers 60, particles are removed from the working fluid. Once the second portion of working fluid has passed completely through the filter papers 60, this now clarified working fluid flows into the spiral channels 100, into and outwardly through the radial channels 104, through spaces formed by the recessed edge portions 120 and recessed interior portions 122, and into a space created between the inner circumference of the outer shell 70 and the outer circumferences of the filter papers 60, filter spacers 62, filter supports 64, and shear discs 66. The second portion of working fluid that has been clarified by the filter papers 60 then exits the filtration system 10 through the clarified working fluid outlet 79. The clarified working fluid can be directed through the second supply hose 241 of the working fluid recirculation and drainage system 226 and to the wash chamber 214 via the sprayers 220 or to the reservoir.

As the second portion of the working fluid is filtered by the filter papers 60, particles removed from the second portion of working fluid are continuously dislodged from the surfaces of the filter papers 60 by the shear force resulting from the combined movement of working fluid along the surfaces of the filter papers 60 and the movement of the physical element spaced from the surface of the filter papers 60, the shear disc 66. The shear force is only produced in small part by the movement of the first portion of the working fluid through the filtration system 10, which works to sweep away particles that are not firmly lodged on the surface of the filter papers 60. The shear force provided by the flow of the working fluid can be increased somewhat by increasing the rate at which the working fluid is pumped through the filtration system 10. However, the shear force provided by the working fluid is mechanically enhanced by shear force produced by the rotational movement of the shear discs 66 due to their close proximity to the filter papers 60. This enhanced shear force works to dislodge larger particles and particles that are embedded in the surface of the filter papers 60. These dislodged particles are swept away by the first portion of working fluid, which is then returned to the sump 224 via the first supply hose 239. The working fluid and dislodged particles can then optionally be drained using the drain circuit 228.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An appliance comprising:
   a washing chamber for holding articles to be washed;
   a recirculation circuit for recirculating working fluid in the wash chamber;
   a cross-flow filter located within the recirculation circuit for filtering particles from the working fluid;
   a rotating disc spaced from the cross-flow filter for enhancing a shear force associated with the working fluid passing along the cross-flow filter; and
   a pump for recirculating the working fluid at a rate sufficient to dislodge particles from the cross-flow filter.

2. The appliance of claim 1 and further comprising a sump fluidly connected with the recirculation circuit.

3. The appliance of claim 1 and further comprising a motor configured to rotate the rotating disc.

4. An appliance comprising:
   a washing chamber for holding articles to be washed;
   a recirculation circuit for recirculating working fluid in the wash chamber;
   a cross-flow filter located within the recirculation circuit for filtering particles from the working fluid; and
   a rotating disc spaced from the cross-flow filter for enhancing a shear force associated with the working fluid passing along the cross-flow filter.

5. The appliance of claim 4 and further comprising a motor configured to rotate the rotating disc.

* * * * *